United States Patent
Song et al.

(10) Patent No.: US 9,308,507 B2
(45) Date of Patent: Apr. 12, 2016

(54) DEVICE FOR REVAPORIZING NATURAL GAS

(75) Inventors: Myung Ho Song, Seoul (KR); Yong Seok Yoon, Seoul (KR); Hye Jung Hong, Seoul (KR); Jung Huyk Ahn, Goyang-si Gyeonggi-do (KR); Mun Keun Ha, Geoje-si Gyeongsangnam-do (KR); Seok Ku Jeon, Seoul (KR); Hoon Ahn, Seoul (KR); Ta Kwan Woo, Busan (KR)

(73) Assignees: Dongguk University Industry-Academic Cooperation Foundation, Seoul (KR); Samsung Heavy Ind. Co., Ltd., Seoul (KR); Hyundai Engineering Co., Ltd., Seoul (KR); Sung-Il Turbine Co., Ltd., Busan (KR); Daewoo Engineering & Construction Co., Ltd., Seoul (KR)

( * ) Notice: Subject to any disclaimer, the term of this patent is extended or adjusted under 35 U.S.C. 154(b) by 302 days.

(21) Appl. No.: 13/818,433

(22) PCT Filed: Aug. 23, 2010

(86) PCT No.: PCT/KR2010/005596
§ 371 (c)(1),
(2), (4) Date: Feb. 22, 2013

(87) PCT Pub. No.: WO2012/026630
PCT Pub. Date: Mar. 1, 2012

(65) Prior Publication Data
US 2013/0149212 A1      Jun. 13, 2013

(51) Int. Cl.
*B01D 11/02* (2006.01)
*B01J 3/04* (2006.01)
*F17C 7/04* (2006.01)

(52) U.S. Cl.
CPC ..... *B01J 3/04* (2013.01); *F17C 7/04* (2013.01)

(58) Field of Classification Search
None
See application file for complete search history.

(56) References Cited

U.S. PATENT DOCUMENTS

| 6,254,764 B1 * | 7/2001 | Babington et al. ............ 205/688 |
| 2007/0092438 A1 * | 4/2007 | Godfrey ..................... 423/658.2 |

(Continued)

FOREIGN PATENT DOCUMENTS

| JP | 2005076640 A | 3/2005 |
| JP | 2005255076 A | 9/2005 |
| JP | 2006138349 A | 6/2006 |

OTHER PUBLICATIONS

International Search Report or PCT/KR2010/005596.

*Primary Examiner* — Patrick Ryan
*Assistant Examiner* — Jose Colucci Rios
(74) *Attorney, Agent, or Firm* — Locke Lord LLP; James E. Armstrong, IV; Howard M. Gitten

(57) ABSTRACT

Disclosed is a device for revaporizing natural gas. Provided is a device for revaporizing natural gas hydrate pellets, comprising: a pellet charging portion for charging pellets which is formed with an upper valve and a lower valve so as to divide space for adjusting pressure; a storing portion, which communicates with the lower portion of the pellet charging portion, for receiving pellets when the lower valve is opened; a transfer screw, one end of which couples to the lower portion of the storing portion, for transferring the pellets in the storing portion; and a dissolving reaction tub, which is coupled to the other end of the transfer screw, receives pellets from the lower portion of the dissolving reaction tub, and which accommodates heating water.

9 Claims, 3 Drawing Sheets

(56) References Cited

U.S. PATENT DOCUMENTS

| | | | |
|---|---|---|---|
| 2010/0083568 A1* | 4/2010 | Yanagisawa et al. | 44/500 |
| 2010/0199559 A1* | 8/2010 | Hallett et al. | 48/127.7 |
| 2010/0325955 A1* | 12/2010 | Watanabe et al. | 48/78 |
| 2010/0326132 A1* | 12/2010 | Murayama et al. | 62/611 |
| 2011/0194905 A1* | 8/2011 | Murayama | 406/14 |

\* cited by examiner

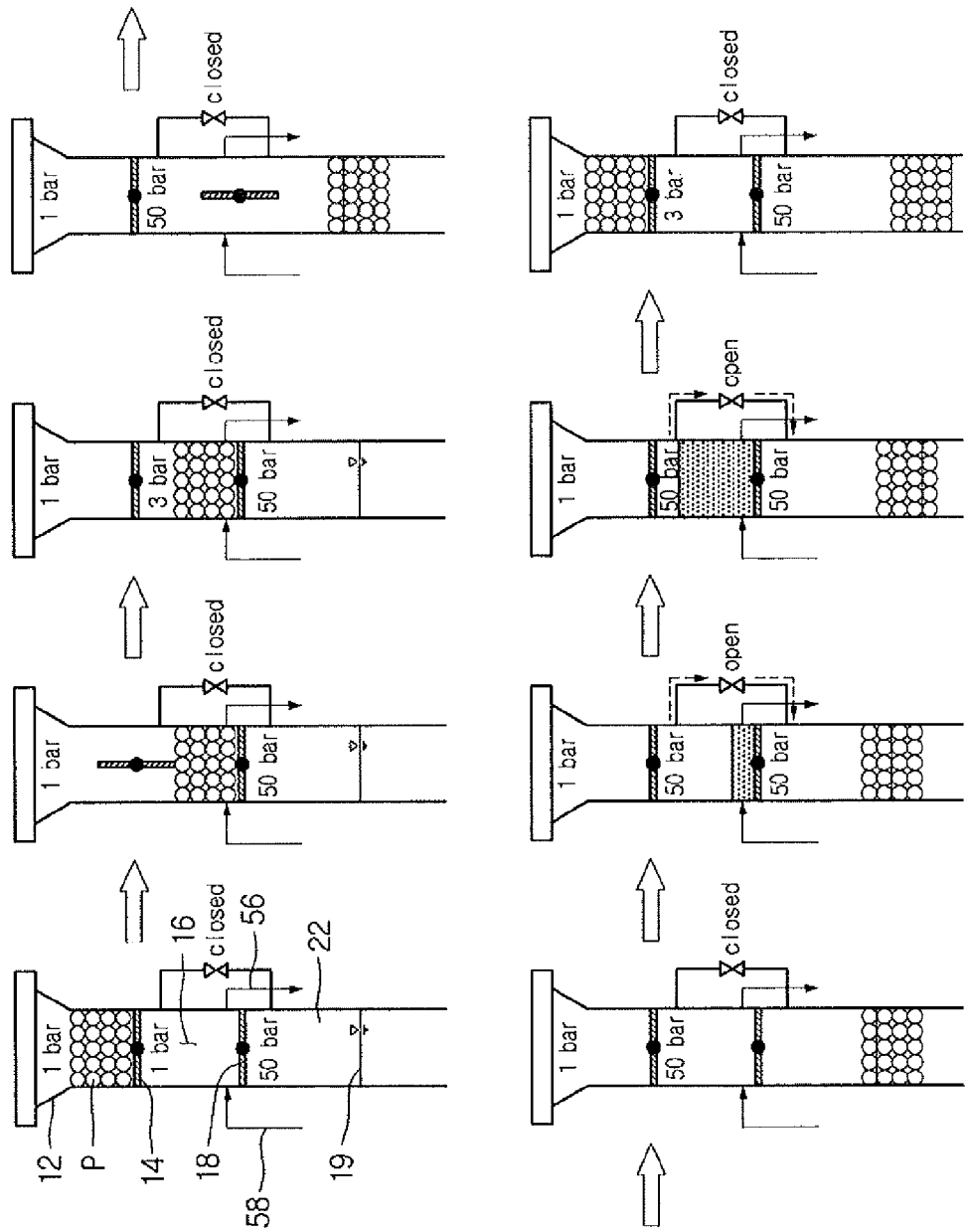

DEVICE FOR REVAPORIZING NATURAL GAS

CROSS-REFERENCE TO RELATED APPLICATIONS

This application is the national phase under 35 U.S.C. §371 of PCT International Application No. PCT/KR2010/005596, filed Aug. 23, 2010, the entire contents of the aforementioned application is hereby incorporated herein by reference.

TECHNICAL FIELD

The present invention relates to a device for revaporizing natural gas, more specifically to a device for revaporizing natural gas that can produce high-pressure natural gas without pressurization by dissolving natural gas hydrate pellets.

BACKGROUND ART

Natural gas is a clean fossil fuel of which the demand has skyrocketed globally and the resource development has been fiercely competed because it generates significantly smaller quantities of carbon dioxide per fuel mass during the combustion than coal and petroleum.

Natural gas that is produced from gas fields is used as fuel through transportation and storage processes after removing mostly sulfur, carbon dioxide, water and polymer hydrocarbon but methane.

Since the price of natural gas is mostly dependent upon the facility and operation costs of implementing the above processes in addition to the margin and interest, the most economical transportation and storage method is selected, considering various factors such as the size of the gas field and the distance to the consumer. The most typical marine transportation method is the LNG (liquefied natural gas) method, and the compressibility of LNG is about 600 when it is normal condition methane.

Nonetheless, the economic feasibility of the LNG method is restricted due to the cryogenic requirement of LNG, and thus the LNG method is applicable for gas fields with a certain scale or more (i.e., currently at least about 3 trillions of cubic feet).

In order for methane, which is the main component of natural gas, to exist stably as a liquid under normal pressure, the temperature needs to be −162 degrees Celsius or lower. Accordingly, metal materials used in the LNG facility that is exposed to cryogenic conditions need to include high concentrations of expensive nickel so as to minimize the brittleness. Moreover, due to a great difference in temperature between the inside and the outside during the transportation and storage processes, heat influx causes a large amount of BOG (boil off gas) to be generated.

In order to achieve economic feasibility of developing relatively small scale gas fields by overcoming these shortcomings and saving production costs of natural gas, GTS (gas to solid) technologies have been widely studied to transport/store natural gas using solid gas hydrate as storage medium. Particularly, in 1990, a Norwegian professor, named Prof. Gudmundsson, presented the self-preservation effect theory of hydrate to motivate many industrialized nations, such as Japan, to develop key technologies required for realizing commercial GTS methods.

Natural gas hydrate (NGH), which is crystal mixture in which natural gas molecules are collected within solid state lattices of hydrogen-bonding water molecules, has an external shape that is similar to ice and maintains its solid state stably if a pressure that is higher than a certain value is applied at a given temperature. In order for methane hydrate to stably exist thermodynamically under normal pressure; the temperatures needs to be −80 degrees Celsius or lower, but the self-preservation effect of delaying the decomposition of hydrate for several weeks is discovered when ice film is formed on the surface of a hydrate particle at temperatures of about −20 degrees Celsius.

The gas compressibility of NGH is about 170 (that is, about 170 cc of normal condition natural gas is stored in 1 cc of hydrate), which is disadvantageous than LNG, but the temperature condition for transportation and storage of NGH is more advantageous. Accordingly, it has been theoretically verified that the GTS method using NGH is an economically alternative option of the LNG method for small-to-medium scale gas fields.

The elemental technologies constituting the GTS method include the NGHP (natural gas hydrate pellet) production technology, which transforms natural gas to the pellet type of hydrate before transporting/storing natural gas, and the revaporizing technology, which recovers natural gas by decomposing the NGH afterwards.

The conventional device for revaporizing natural gas induces decomposition of NGH pellets, which have been charged into a storage tank that is also for transportation, by supplying heating water from the bottom of the tank at the location of consumption, discharges the water that is decomposed and the supplied hot water after it is cooled to an outside, and recovers the decomposed gas.

This method, however, has shortcomings that it is not possible to produce a large amount of high-pressure gas continuously and that it is not possible to use the residual gas that is remaining inside the tank.

Moreover, although the conventional continuous revaporizing technology reflects the basic concept of separating and recovering high-pressure gas generated by inputting NGH pellets into a revaporization reaction tub, which is heated by the circulating heating water, from the decomposed water, the conventional continuous revaporizing technology lacks specific details required for making a practical revaporizing device.

DISCLOSURE

Technical Problem

The present invention can provide a device for revaporizing natural gas that can produce high-pressure natural gas without additional compression by dissolving natural gas hydrate pellets.

Technical Solution

An aspect of the present invention features a device for revaporizing natural gas that revaporizes natural gas hydrate pellets. The device for revaporizing natural gas in accordance with an embodiment of the present invention includes: a pellet charging portion configured to have the pellets charged therein and having an upper valve and a lower valve formed therein so as to divide a pressure adjusting space; a storing portion communicating with a lower portion of the pellet charging portion and configured to have the pellets flowed therein when the lower valve is opened; a transfer screw having one end thereof coupled with a lower portion of the storing portion and configured to transfer the pellets in the storing portion; and a dissolving reaction tub coupled to the other end of the transfer screw and having the pellets flowed in from a lower portion thereof and having heating water accommodated therein.

The device for revaporizing natural gas can also include a pulverizing portion arranged in between the other end of the transfer screw and the dissolving reaction tub and configured to pulverize the transferred pellets. Moreover, the device for revaporizing natural gas can also include: a pressure adjusting valve configured to open and close communication between the pressure adjusting space and the storing portion; and a pressurized water supply portion configured to supply pressurized water to the pressure adjusting space and recover the supplied pressurized water.

The pressurized water supply portion can include: an atmospheric pressure tank being in an atmospheric pressure state and configured to have the pressurized water recovered thereto; a high-pressure tank having high-pressure gas and pressurized water stored therein and configured to supply the pressurized water to the pressure adjusting space; and a pump configured to supply the pressurized water in the atmospheric pressure tank to the high-pressure tank.

The device for revaporizing natural gas can also include: a heating water circulating line configured to recover the heating water from an upper portion of the dissolving reaction tub and supply the heating water to the lower portion of the dissolving reaction tub; a circulating pump arranged in the heating water circulating line and configured to circulate the recovered heating water; and a heater arranged in the heating water circulating line and configured to heat the recovered heating water.

The device for revaporizing natural gas can also include a heating water supply line branched at a downstream of the heater in the heating water circulating line and configured to supply the heating water to the one end portion of the transfer screw.

A pressure inside the dissolving reaction tub can be between 50 bar and 70 bar.

The dissolving reaction tub can have a mesh net formed therein below a surface of the heating water for filtering pulverized pellets.

The mesh net can be provided in plurality, depending on a height of the dissolving reaction tub, and the size of mesh in the plurality of mesh nets can become gradually smaller toward a top.

The dissolving reaction tub can have an agitator installed inside thereof so as to agitate the heating water and pulverized pellets.

The dissolving reaction tub can have a supersonic vibrator attached to a surface thereof.

DESCRIPTION OF DRAWINGS

FIG. 3 illustrates steps for charging pellets and recovering residual gas in the device for revaporizing natural gas in accordance with an embodiment of the present invention.

MODE FOR INVENTION

Figure 1:
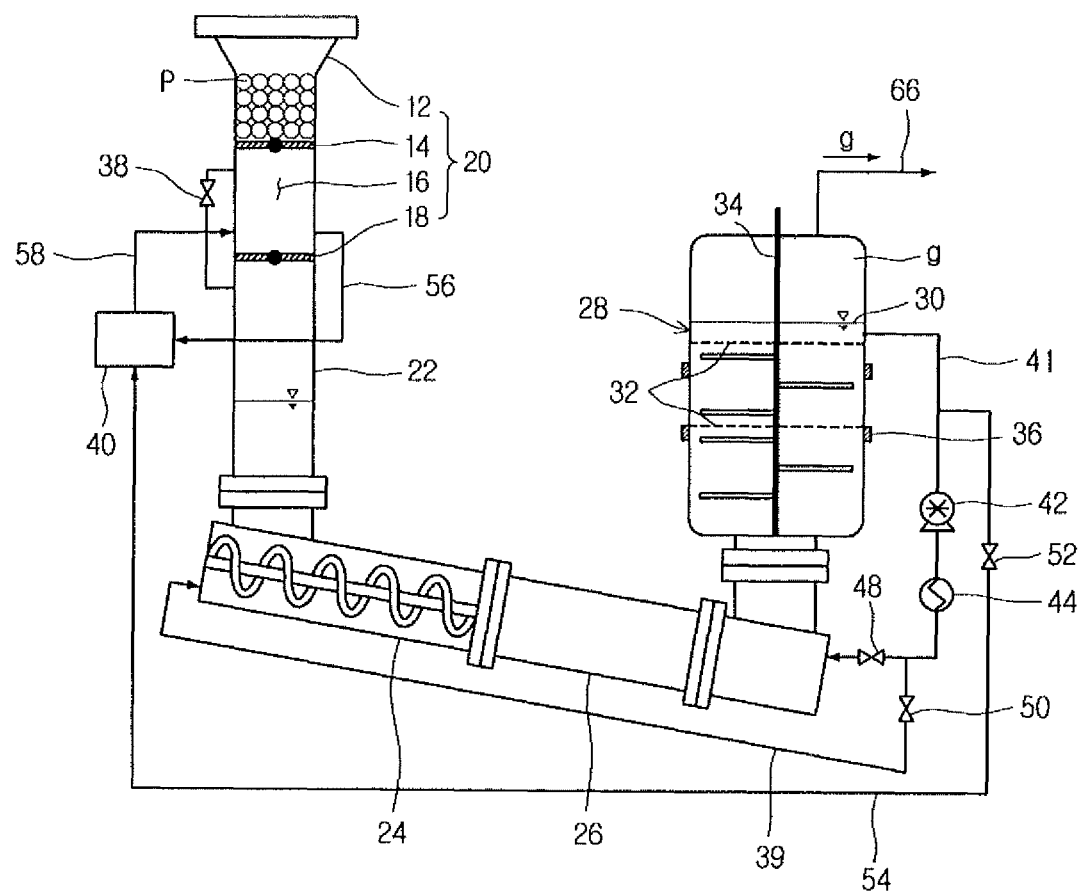
FIG. 1 is a device for revaporizing natural gas in accordance with an embodiment of the present invention.

Since there can be a variety of permutations and embodiments of the present invention, a certain embodiment will be illustrated and described with reference to the accompanying drawings. This, however, is by no means to restrict the present invention to a certain embodiment, and shall be construed as including all permutations, equivalents and substitutes covered by the ideas and scope of the present invention. Throughout the description of the present invention, when describing a certain relevant conventional technology is determined to evade the point of the present invention, the pertinent detailed description will be omitted.

Hereinafter, a device for revaporizing natural gas in accordance with a certain embodiment will be described in detail with reference to the accompanying drawings. Identical or corresponding elements will be given the same reference numerals, regardless of the figure number, and any redundant description of the identical or corresponding elements will not be repeated.

Figure 2:
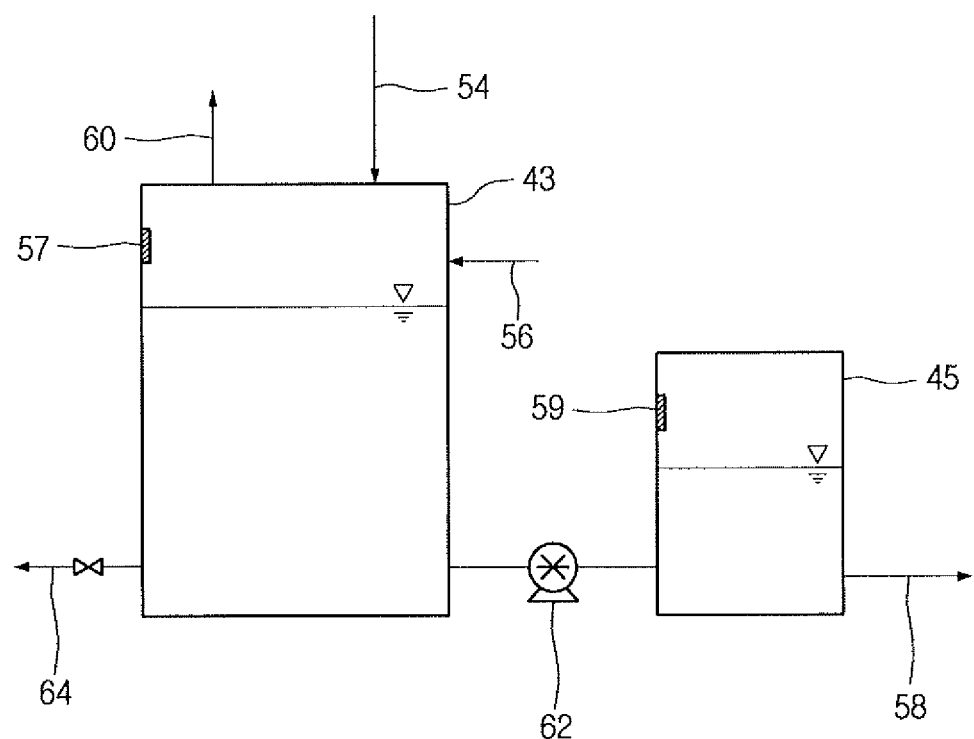
FIG. 2 is a pressurized water supply portion of the device for revaporizing natural gas in accordance with an embodiment of the present invention.

FIG. 1 is a device for revaporizing natural gas in accordance with an embodiment of the present invention, and FIG. 2 is a pressurized water supply unit of the device for revaporizing natural gas in accordance with an embodiment of the present invention. Illustrated in FIGS. 1 and 2 are a charging hole 12, an upper valve 14, a pressure adjusting space 16, a lower valve 18, a pellet charging portion 20, a storing portion 22, a transfer screw 24, a pulverizing portion 26, a dissolving reaction tub 28, heating water 30, a mesh net 32, an agitator 34, a supersonic vibrator 36, a pressure adjusting valve 38, a pressurized water supply portion 40, a heating water supply line 39, a heating water circulating line 41, a circulating pump 42, an atmospheric pressure tank 43, a heater 44, a high-pressure tank 45, a valve 48, 50, 52, a heating water recovering line 54, a pressurized water recovering line 56, a water level sensor 57, 59, a pressurized water supply line 58, an atmospheric pressure gas recovering line 60, a pump 62, a drain line 64 and a gas discharging line 66.

The device for revaporizing natural gas in accordance with the present embodiment is a device for revaporizing natural gas hydrate pellets (P) and includes: the pellet charging portion 20 for charging the pellets (P) which is formed with the upper valve 14 and the lower valve 18 so as to divide the pressure adjusting space 16; the storing portion 22, which communicates with the lower portion of the pellet charging portion 20, for receiving the pellets (P) when the lower valve 18 is opened; the transfer screw 24, one end of which couples to the lower portion of the storing portion 22, for transferring the pellets (P) of the storing portion 22; and the dissolving reaction tub 28, which is coupled to the other end of the transfer screw 24, receives the pellets (P) from the lower portion of the dissolving reaction tub 28, and which accommodates the heating water 30.

The natural gas hydrate pellet (P) refers to what is converted to the pellet type of hydrate from natural gas for transportation or storage of natural gas, and the natural gas generated while the natural gas hydrate pellets (P) and the heating water are agitated is collected and supplied to a supplier.

The pellet charging portion 20 is charged with the natural gas hydrate pellets ("pellet" or "pellets" hereinafter) and is formed with the upper valve 14 and the lower valve 18 so as to divide the pressure adjusting space 16. The present embodiment provides a the charging hole 12 in the shape of a hopper so that the pellet type of natural gas hydrate can be easily charged and the pellet charging portion 20 in the shape of a conduit so as to communicate with the charging hole 12. The charging hole 12 has the upper valve 14 at a lower end thereof and the lower valve 18 at a predetermined distance below the upper valve 14'. A space demarcated by the upper valve 14 and the lower valve 18 becomes the pressure adjusting space 16.

When the pellets (P) are charged into the charging hole 12 under atmospheric pressure while the upper valve 14 and the lower valve 18 are closed, the upper valve 14 becomes open, and the pellets (P) are put into the pressure adjusting space 16. Accordingly, the pressure adjusting space 16 becomes a state of atmospheric pressure, and a state of high-pressure gas filled below the lower valve 18 is maintained, like the dissolving reaction tub 28.

The storing portion 22 communicates with the lower portion of the pellet charging portion 20 and has the pellets (P) put thereinto when the lower valve 18 is opened. The storing portion 22 is a space for temporarily storing the pellets (P) before supplying the pellets (P) to the dissolving reaction tub 28. If the lower valve 18 is opened while the upper valve 14 is closed, the pellets (P) in the pressure adjusting space 16 are put into the storing portion 22, and the pressure adjusting space 16 becomes filled with high-pressure gas, like the storing portion 22. In this process, the high-pressure gas that has been in the storing portion 22 becomes filled in the pressure adjusting space 16 and elevates the water level of heating water in the storing portion 22, and the pellets (P) are put into the storing portion 22 to make the volume of the storing portion 22 greater than that of the pressure adjusting space 16.

If the water level of the heating water 30 in the storing portion 22 is high, the pellets (P) becomes to float on the surface of the heating water 30, making it difficult to put the pellets (P) into the transfer screw 24. Therefore, once the pellets (P) are put into the storing portion (22, the level of the heating water 30 in the storing portion 22 is dropped below the lower end of the storing portion 22 to allow the pellets (P) to be readily put into the transfer screw 24. Specifically, in the later-described step of recovering the high-pressure gas from the pressure adjusting space 16, the pressure of the storing portion becomes increased, and decomposed gas is partially generated from the pellets (P) in the storing portion 22 to further increase the pressure of the storing portion 22. Accordingly, the level of the heating water 30 in the storing portion 22 becomes lower to a level below the lower end of the storing portion 22, and the pellets (P) are readily put into the transfer screw 24.

The device for revaporizing natural gas in accordance with the present embodiment can also include the pressure adjusting valve 38, which opens and closes communication between the pressure adjusting space 16 and the storing portion 22, and the pressurized water supply portion 40, which supplies pressurized water to the pressure adjusting space 16 and recovers the supplied pressurized water.

As the upper valve 14 is opened, the pellets (P) are put into the pressure adjusting space 16, and the pressure adjusting space 16 is filled with the pellets (P) under atmospheric pressure when the upper valve 14 is closed. If the lower valve 18 is opened under this condition, the pellets (P) are put into the storing portion 22, and the pressure adjusting space 16 is filled with high-pressure gas by the high-pressure state of the dissolving reaction tub 28. The lower valve 18 becomes closed in order to have the pellets (P) supplied again while the pellets (P) are put into the storing portion 22, and as the upper valve 14 and the lower valve 18 are closed, the pressure adjusting space 16 maintains the state of being filled with high-pressure gas. In order to recover the high-pressure gas that is present in the pressure adjusting space 16, the high-pressure gas in the pressure adjusting space 16 is returned to the storing portion 22 by supplying pressurized water to the pressure adjusting space 16 through the pressurized water supply line 58 from the pressurized water supply portion 40 while the pressure adjusting valve 38, which opens and closes communication between the pressure adjusting space 16 and the storing portion 22, is opened. Once the high-pressure gas in the pressure adjusting space 16 is returned to the storing portion 22 by the supplied pressurized water, the pressure adjusting valve 38 is closed, and the pressurized water supplied to the pressure adjusting space 16 is recovered to the pressurized water supply portion 40 again through the pressurized water recovering line 56 to return the pressure adjusting space 16 to the state of atmospheric pressure and prepare the pressure adjusting space 16 for charging next pellets (P).

The pressurized water supply portion 40 can include: the atmospheric pressure tank 43, which is in an atmospheric pressure state and to which the pressurized water in the pressure adjusting space 16 is recovered; the high-pressure tank 45, which has high-pressure gas and pressurized water stored therein and supplies the pressurized water to the pressure adjusting space 16; and the pump 62, which supplies the pressurized water of the atmospheric pressure tank 43 to the high-pressure tank 45.

The atmospheric pressure tank 43 has the pressurized water stored therein under atmospheric pressure and at a certain level, and the pressurized water in the atmospheric pressure tank 43 is supplied to the high-pressure tank 45 through the pump 62, which then stores the pressurized water under a pressure that is greater than that of the storing portion 22 in order to supply the pressurized water quickly to the pressure adjusting space 16.

The high-pressure tank 45 has the water level sensor 59, which senses a level of the pressurized water, arranged therein to allow the pump 62 to stop its operation when the pressurized water in the high-pressure tank 45 reaches a certain level. In addition, the atmospheric pressure tank 43 can also have the water level sensor 57, which senses a level of the pressurized water, arranged therein to allow the pressurized water to be discharged to an outside from the atmospheric pressure tank 43 through the drain line 64 when the level of the pressurized water becomes a certain level or higher.

In the case that the water level is high inside the dissolving reaction tub 28, while heating water can be recovered to the atmospheric pressure tank 43 through the heating water recovering line 54, which is branched from the heating water circulating line 41, the decomposed gas is flowed in together in the form of air bubbles. To recover such natural gas in the state of atmospheric pressure, the atmospheric pressure gas recovering line 60 for recovering the natural gas is connected to an upper portion of the atmospheric pressure tank 43, and the atmospheric-pressure gas can be recovered from the atmospheric pressure gas recovering line 60 and stored. The valve 52 adjusts an amount of the recovered heating water 30.

The transfer screw 24 is coupled and communicated with a lower end of the storing portion 22 and transfers the pellets (P) that are in the storing portion 22. An input hole is arranged in one end portion of the transfer screw 24, and an outlet hole is arranged in the other end portion of the transfer screw 24.

As described above, the level of the heating water in the storing portion 22 drops below the lower end of the storing portion 22 while the pellets (P) are inputted, and accordingly, placed above the input hole of the transfer screw 24 are the pellets (P) that are not submerged in the heating water 30 so that the pellets (P) can be readily inputted into the transfer screw 24. The transfer screw 24 functions to push the pellets (P) placed in the storing portion 22 to the dissolving reaction tub 28.

The pulverizing portion 26 can be disposed in between the other end portion of the transfer screw 24 and the dissolving reaction tub 28, and pulverizes the transferred pellets (P) to allow the pulverized pellets (P) to be supplied to the lower portion of the dissolving reaction tub 28.

The pulverizing portion 26 communicates with the outlet hole located at the other end portion of the transfer screw 24 and pulverizes the transferred pellets (P). The pellets (P) are partially pulverized through the transfer screw 24 and then finely pulverized in the pulverizing portion 26 and supplied to the lower portion of the dissolving reaction tub 28. A dissolving reaction of the pellets (P) is immediately commenced as the pellets (P) pass through the transfer screw 24 and the pulverizing portion 26.

The pulverizing portion 26 can be constituted with a rotating blade and a fixed blade that intersect with each other and pulverizes the pellets (P) into particles of a certain size or smaller and supplies the pulverized pellets (P) to the lower portion of the dissolving reaction tub 28. The pellets (P) having passed through the pulverizing portion 26 and crushed to be particles of the certain size or smaller have increased reaction surface areas and thus have an accelerated dissolving reaction.

The dissolving reaction tube 28 is connected with the pulverizing portion 26, configured to have the pulverized pellets (P) to be inputted from the lower portion of the dissolving reaction tub 28, and has the heating water 30 present therein. As the pulverized pellets (P0 are inputted from the lower portion of the dissolving reaction tub 28 filled with the heating water 30, the pulverized pellets (P) are submerged in the heating water 30 while the pulverized pellets (P) move from a bottom to a top of the heating water 30, making it more ideal for heat transfer required for a dissolving reaction. The pulverized pellets (P) are moved from the bottom to the top of the heating water 30 filled in the dissolving reaction tub 28 by buoyancy of the pellets (P) and movement of the heating water 30 caused by circulation of the heating water 30.

In order to produce high-pressure gas directly through the dissolving reaction tub 28, a state of high pressure can be maintained inside the dissolving reaction tub 28. For example, it is possible to maintain the pressure inside the dissolving reaction tub 28 at 50 bar to 70 bar. Accordingly, the device for revaporizing natural gas in accordance with an embodiment of the present invention can be installed in a gas turbine that requires high-pressure gas or in a facility for supplying town gas for domestic use. As the dissolving reaction tub 28 maintains the high-pressure state, the pulverizing portion 26, the transfer screw 24 and the storing portion 22, which communicate with the dissolving reaction tub 28, also maintain the same high-pressure state, except that the pressure can be changed in the pressure adjusting space 16 by the opening and closing of the upper valve 14 or the lower valve 18.

The dissolving reaction tub 28 can have the mesh net 32 formed therein below the surface of the heating water 30 for filtering the pulverized pellets (P). In addition, the mesh net 32 can be provided in plurality, depending on a height of the dissolving reaction tub 28, and the size of mesh in the plurality of mesh nets 32 can be gradually smaller toward the top. Accordingly, an upward movement speed of the pulverized pellets (P), which become smaller as the dissolving reaction proceeds, can be controlled, and the pulverized pellets (P) can be evenly distributed within the dissolving reaction tub 28 to increase the contact with the heating water 30 and provide a passage through which the decomposed gas generated by the dissolving reaction is elevated after passing through the heating water 30, thereby increasing the efficiency of the dissolving reaction.

Moreover, in order to facilitate heat transfer between the pulverized pellets (P) and the heating water 30 and isolate the generated decomposed gas from the surfaces of the pellets (P) more efficiently, the dissolving reaction tub 28 can have the agitator 34 installed inside thereof so as to agitate the heating water and the pulverized pellets (P). The agitator 34 can be constituted with a rotation axis, which is arranged lengthwise in the dissolving reaction tub 28, and a plurality of rotor blades, which are coupled to the rotation axis.

Moreover, the dissolving reaction tub 28 can have a supersonic vibrator attached to the surface thereof. The supersonic vibrator can be attached to an external surface or an internal surface of the dissolving reaction tub 28. The present embodiment presents a plurality of supersonic vibrators 36 that are attached to the external surface of the dissolving reaction tub 28. Supersonic waves generated by the supersonic vibrators 36 are transferred through the heating water 30 to facilitate the dissolving reaction of the pulverized pellets (P).

The dissolving reaction tub 28 can have the gas discharging line 66 coupled to an upper portion thereof for discharging the decomposed gas (g), and the decomposed gas (g) that is above the surface of the heating water 30 can be discharged to an outside. The decomposed gas discharged to the outside can be discharged in the high-pressure state corresponding to the pressure of the dissolving reaction tub 28, and the decomposed gas discharged from the dissolving reaction tub 28 can have water separated therefrom by a vapor-liquid separator (not shown) and can be supplied to a gas turbine that requires high-pressure gas or a facility for supplying town gas. The water separated by the vapor-liquid separator can be returned to the atmospheric pressure tank 43 of the pressurized water supply portion 40.

The heating water 30 of the dissolving reaction tub 28 can be discharged from an upper portion of the dissolving reaction tub 28 and can be heated and continuously circulated so as to be flowed in through the lower portion of the dissolving reaction tub 28. Provided for this can be the heating water circulating line 41, which recovers the heating water 30 from the upper portion of the dissolving reaction tub 28 and supplies the heating water 30 to the lower portion of the dissolving reaction tub 28, the circulating pump 42, which is arranged in the heating water circulating line 41 and circulates the recovered heating water, and the heater 44, which is arranged in the heating water circulating line 41 and heats the recovered heating water.

The heating water recovered in the upper portion of the dissolving reaction tub 28 through the heating water circulating line 41 is passed through the circulating pump 42, heated by the heater 44 and then supplied again to the lower portion of the dissolving reaction tub 28. The quantity of heat supplied from the heater 44 can be controlled so as to keep the heating water 30 at a certain temperature or lower.

Moreover, additionally included can be the heating water supply line 39, which is branched at a downstream of the heater 44 in the heating water circulating line 41 and supplies the heating water to the one end portion of the transfer screw 24. Since the pellets (P) can be easily transferred if there is moisture in the transfer screw 24 when the pellets (P) are transferred through the transfer screw 24, the heating water is branched from the heating water circulating line 41 and supplied to the transfer screw 24 from the one end portion thereof.

As the dissolving reaction is continued in the dissolving reaction tub 28, the moisture that has been impregnated in the pellets (P) becomes disintegrated and increases the heating water 30 in the dissolving reaction tub 28. Accordingly, included additionally to discharge the increased heating water 30 can be the heating water recovering line 54, which is branched at an upstream of the circulating pump 42 in the heating water circulating line 41 and recovers the heating water 30 to the pressurized water supply portion 40. In the present embodiment, a water level sensor (not shown) is provided to measure a level of the heating water 30 in the dissolving reaction tub 28 so that the heating water is recovered to the atmospheric pressure tank 43 of the pressurized water supply portion 40 through the heating water recovering line 41 if the heating water 30 inside the dissolving reaction tub 28 reaches a certain level or higher.

FIG. 3 illustrates steps for charging pellets and recovering residual gas in the device for revaporizing natural gas in accordance with an embodiment of the present invention.

Hereinafter, a method for revaporizing natural gas will be described with reference to FIGS. 1 to 3. For the convenience of description, it will be described that the pressure inside the dissolving reaction tub 28 is approximately 50 bar.

Referring to FIG. 3, the pressure adjusting space 16 and the charging hole 12 are in the atmospheric-pressure states, and as the dissolving reaction tub 28 maintains a high-pressure state of 50 bar while the lower valve 18 is closed, the storing portion 22, the transfer screw 24 and the pulverizing portion 26, of which air current is connected with the dissolving reaction tub 28, are given a pressure of 50 bar.

First, after the pellets (P) are charged into the charging hole 12 under atmospheric pressure while the upper valve 14 and the lower valve 18 are closed, the upper valve 14 is opened to charge the pellets (P) into the pressure adjusting space 16. This causes the pressure adjusting space 16 to be in the state of atmospheric pressure. By closing the upper valve 14 and opening the lower valve 18, the pellets (P) that have been in the pressure adjusting space 16 are put into the storing portion 22, and 50 bar of gas, which is the same pressure as the storing portion 22, is flowed into the pressure adjusting space 16, and then the pressure adjusting space 16 is filled with 50 bar of gas as the lower valve 18 is closed again.

In order to recover the high-pressure gas captured in the pressure adjusting space 16 by the closing of the upper valve 14 and the lower valve 18, the pressurized water is supplied to the pressure adjusting space 16 through the pressurized water supply portion 40 to return the high-pressure gas in the pressure adjusting space 16 to the storing portion 22, while the pressure adjusting valve 38, which opens and closes communication between the pressure adjusting space 16 and the storing portion 22, is opened. Then, once the high-pressure gas in the pressure adjusting space 16 is returned to the storing portion 22 by the supply of the pressurized water, the pressure adjusting valve 38 is closed, and the pressurized water supplied to the pressure adjusting space 16 is recovered again to the pressurized water supply portion 40 to return the pressure adjusting space 16 to the state of atmospheric state and prepare for charging of next pellets (P).

The pellets (P) put into the storing portion 22 are supplied to the transfer screw 24 through the input hole of the transfer screw 24 that is connected to the lower end of the storing portion 22 and then transferred to the pulverizing portion 26 by operation of the transfer screw 24. Here, the level of the heating water 30 is below the storing portion 22 so as to facilitate the supply of the pellets (P) to the transfer screw 24.

The pellets (P) introduced through the transfer screw 24 are passed through the pulverizing portion 26 and pulverized to be smaller than a certain size so as to increase the reaction surface areas, and then are supplied to the lower portion of the dissolving reaction tub 28.

The pulverized pellets (P) supplied to the lower portion of the dissolving reaction tub 28 are moved from the lower portion to the upper portion of the dissolving reaction tub 28 by buoyancy and transfer of the heating water 30 and have the dissolving reaction in the heating water 30. In this process, the pulverized pellets (P) are dissolved and pass through the mesh net 32 of the dissolving reaction tub 28. The natural gas decomposed in the dissolving reaction tub 28 becomes to fill a portion above the heating water 30 in the high-pressure state, and is discharged to an outside through the gas discharging line 66. In order to facilitate the dissolving reaction in the dissolving reaction tub 28, the pulverized pellets (P) and the heating water 30 are agitated by the agitator 34 of the dissolving reaction tub 28, and at the same time the supersonic waves generated by the supersonic vibrator 36 accelerate the dissolving reaction.

While the dissolving reaction occurs in the dissolving reaction tub 28, the heating water 30 of the dissolving reaction tub 28 is continuously circulated so as to be discharged from the upper portion of the dissolving reaction tub 28, heated and flowed into the lower portion of the dissolving reaction tub 28.

As the dissolving reaction is continued in the dissolving reaction tub 28, the heating water of the dissolving reaction tub 28 increases, and the increased heating water is returned to the pressurized water supply portion 40 through the heating water recovering line 54 branched from the heating water circulating line 41.

Although a certain embodiment of the present invention has been described above, it shall be appreciated that there can be a variety of permutations and modifications of the present invention by those who are ordinarily skilled in the art to which the present invention pertains without departing from the technical ideas and scope of the present invention, which shall be defined by the appended claims.

It shall be also appreciated that a large number of other embodiments than the above-described embodiment are included in the claims of the present invention.

What is claimed is:

1. A device for revaporizing natural gas, the device being configured to revaporize natural gas hydrate pellets, the device comprising:
  (i) a pellet charging portion configured to have the pellets charged therein and having an upper valve and a lower valve formed therein so as to divide a pressure adjusting space;
  (ii) a storing portion communicating with a lower portion of the pellet charging portion and configured to have the pellets flowed therein when the lower valve is opened and have the pellets in flow therefrom when a water level of heating water is dropped below a lower portion of the storing portion;
  (iii) a transfer screw having one end thereof coupled with the lower portion of the storing portion and configured to transfer the pellets in the storing portion;
  (iv) a dissolving reaction tub coupled to the other end of the transfer screw and having the pellets flowed in from a lower portion thereof and having heating water accommodated therein;
  (v) a pressure adjusting valve configured to open and close communication between the pressure adjusting space and the storing portion; and
  (vi) a pressurized water supply portion configured to supply pressurized water to the pressure adjusting space to return high-pressure gas in the pressure adjusting space back to the storing portion and recover the supplied pressurized water;
    wherein the pressurized water supply portion comprises:
      (a) an atmospheric pressure tank being in an atmospheric pressure state and configured to have the pressurized water recovered thereto;
      (b) a high-pressure tank having high-pressure gas and pressurized water stored therein and configured to supply the pressurized water to the pressure adjusting space; and (c) a pump configured to supply the pressurized water in the atmospheric pressure tank to the high-pressure tank.

2. The device of claim 1, further comprising a pulverizing portion arranged in between the other end of the transfer screw and the dissolving reaction tub and configured to pulverize the transferred pellets.

3. The device of claim 1, further comprising:
a heating water circulating line configured to recover the heating water from an upper portion of the dissolving reaction tub and supply the heating water to the lower portion of the dissolving reaction tub;
a circulating pump arranged in the heating water circulating line and configured to circulate the recovered heating water; and
a heater arranged in the heating water circulating line and configured to heat the recovered heating water.

4. The device of claim 3, further comprising a heating water supply line branched at a downstream of the heater in the heating water circulating line and configured to supply the heating water to the one end portion of the transfer screw.

5. The device of claim 1, wherein a pressure inside the dissolving reaction tub is between 50 bar and 70 bar.

6. The device of claim 1, wherein the dissolving reaction tub has a mesh net formed therein below a surface of the heating water for filtering pulverized pellets.

7. The device of claim 6, wherein the mesh net is provided in plurality, depending on a height of the dissolving reaction tub, and the size of mesh in the plurality of mesh nets becomes gradually smaller toward a top.

8. The device of claim 1, wherein the dissolving reaction tub has an agitator installed inside thereof so as to agitate the heating water and pulverized pellets.

9. The device of claim 1, wherein the dissolving reaction tub has a supersonic vibrator attached to a surface thereof.

* * * * *